United States Patent
Hayashi et al.

(10) Patent No.: US 7,626,911 B2
(45) Date of Patent: Dec. 1, 2009

(54) HOLOGRAM REPRODUCTION APPARATUS AND HOLOGRAM REPRODUCTION METHOD

(75) Inventors: Kunihiko Hayashi, Kanagawa (JP); Nobuhiro Kihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 649 days.

(21) Appl. No.: 11/300,366

(22) Filed: Dec. 15, 2005

(65) Prior Publication Data

US 2006/0153044 A1    Jul. 13, 2006

(30) Foreign Application Priority Data

Dec. 20, 2004   (JP)   ............... 2004-366994

(51) Int. Cl.
   *G11B 7/00*   (2006.01)
(52) U.S. Cl. ...................................... 369/103
(58) Field of Classification Search ............... 359/212, 359/216; 369/103, 126, 44.27, 44.28
   See application file for complete search history.

(56) References Cited

U.S. PATENT DOCUMENTS

| | | | |
|---|---|---|---|
| 7,079,469 B2 * | 7/2006 | Itoh et al. ................. | 369/103 |
| 7,148,468 B2 * | 12/2006 | Jung ......................... | 250/225 |
| 7,236,441 B2 * | 6/2007 | Tanaka et al. ............. | 369/103 |
| 7,254,106 B2 * | 8/2007 | Ichihara et al. ........... | 369/103 |
| 7,304,933 B2 * | 12/2007 | An et al. .................... | 369/103 |
| 7,426,168 B2 * | 9/2008 | Kawano et al. ........... | 369/103 |
| 2006/0153044 A1 | 7/2006 | Hayashi et al. | |

OTHER PUBLICATIONS

U.S. Appl. No. 11/866,029, filed Oct. 2, 2007, Hayashi, et al.

* cited by examiner

*Primary Examiner*—Nabil Z Hindi
(74) *Attorney, Agent, or Firm*—Oblon, Spivak, McClelland, Maier & Neustadt, L.L.P.

(57) ABSTRACT

A hologram reproduction apparatus and method is disclosed wherein positioning between reproduction reference light and a hologram recording medium can be performed accurately. Reference light is irradiated upon the medium recorded by angle multiple recording, and reproduction light generated from the medium is received by an image pickup apparatus to reproduce data. Thereupon, projection information of light which cannot pass through an iris but is projected on the iris is detected by an optical detector. A position control section detects a positional displacement of the medium based on projection state information on the inner side of a projection region of reproduction light generated from an adjacent recording area to the recording area of a reproduction target from within the detection information and controls a drive mechanism to move the medium so as to eliminate the positional displacement.

12 Claims, 5 Drawing Sheets

F I G . 8
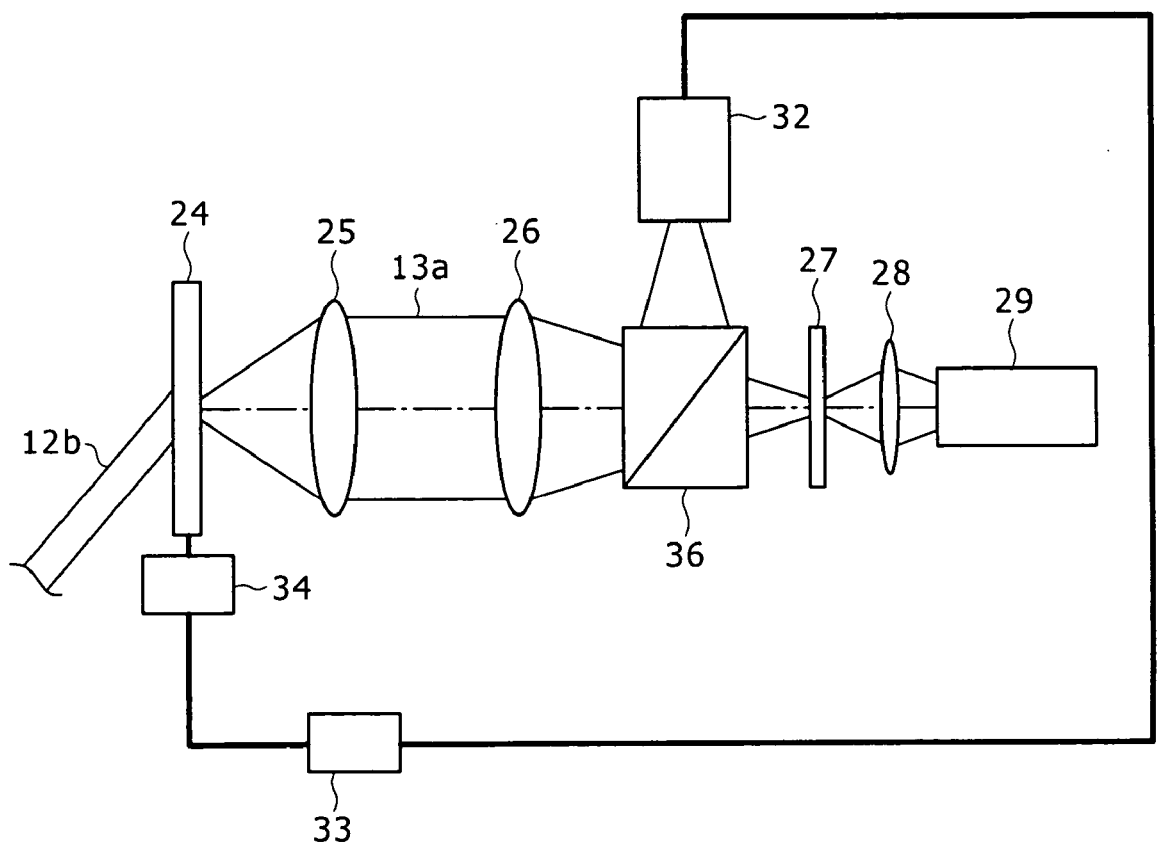

HOLOGRAM REPRODUCTION APPARATUS AND HOLOGRAM REPRODUCTION METHOD

CROSS REFERENCES TO RELATED APPLICATIONS

The present invention contains subject matter related to Japanese Patent Application JP 2004-366994 filed in Japanese Patent Office on Dec. 20, 2004, the entire contents of which being incorporated herein by reference.

BACKGROUND OF THE INVENTION

This invention relates to a hologram reproduction apparatus and method for reproducing multiple recorded data in a hologram recording medium in accordance with an angle multiple method, and more particularly to assurance of the compatibility in such a case that a hologram recording medium is re-set or exchanged with another hologram recording medium recorded by another apparatus.

Conventionally, upon recording of a hologram data storage, the hologram recording medium is disposed in a region in which two light fluxes of signal light and reference light interfere with each other to record interference fringes of the two light fluxes on the hologram recording medium. In order to assure a high recording density on the hologram recording medium upon such recording, various multiple methods such as the angle multiple method mentioned above, a shift multiple method, a speckle multiple method and a phase code multiple method are used for multiple recording of holograms.

In a hologram recording apparatus according to the angle multiple method, two light fluxes of signal light and reference light are irradiated upon a hologram recording medium. Further, every time the signal light is spatially modulated (intensity modulated) with a data page displayed on a spatial light modulator (SLM), the incidence angle (recording angle) of the reference light to the hologram recording medium is varied to multiple record different recording information in the same recording region.

In the hologram recording apparatus of the angle multiple method described, if the variation pitch of the recording angle of the reference light is changed at steps of 0.01 degree within a range of several degrees in the maximum (changed little by little, for example, within the range from 88 to 92 degrees) to multiple record different recording information (data pages) of the same recording area successively, then a plurality of different pieces of recording information such as 50-multile information can be recorded in the same recording area.

On the other hand, a hologram reproduction apparatus which is paired with such a hologram recording apparatus as described above is configured such that the angle of the surface of the hologram recording medium with respect to a light flux of reproduction reference light is varied little by little to reproduce the recording information multiple recorded in the same recording area. It is to be noted that the angle of a light flux of reproduction reference light in reproduction of a hologram recording medium recorded in accordance with such an angle recording method as described above with respect to the surface of the hologram recording medium is hereinafter referred to suitably as "reproduction angle". Further, an angle which makes a reference to the reproduction angle such as, for example, a reproduction angle when it coincides with a normal to the surface of the hologram recording medium is hereinafter referred to suitably as "reference reproduction angle". According to the hologram reproduction apparatus of the angle multiple method, recording information multiplex recorded in the same area can be reproduced for individual reproduction angles by varying the reproduction angle a little corresponding to that in the case of the recording angle from the reference reproduction angle.

In this manner, according to the hologram recording apparatus and the hologram recording method of the angle multiple type, a large number of pieces of recording information can be recorded for the individual recording angles of the reference right in the same recording area and besides the pieces of recording information multiple recorded in this manner can be reproduced separately from each other. Consequently, the recording density and the recording capacity can be increased remarkably.

Incidentally, according to hologram recording, information is usually recorded three-dimensionally in a recording area of a hologram recording medium but is recorded, on the surface of the hologram recording medium, in a two-dimensional area (recording face). Therefore, if the set position of the recording medium is displaced even a little between that upon recording and that upon reproduction, then it becomes less easy to find out the recording face. This is because, if the position of the hologram recording medium varies, then information of the wavefront changes between reference light upon recording and reference light upon reproduction and a reproduction image cannot be obtained thereby. On the other hand, although it is necessary to reduce the distance between adjacent recording areas if it is tried to raise the recording density in a hologram recording medium, as the recording areas come close to each other, then even if the hologram recording medium is displaced a little from a predetermined position upon reproduction, there is the possibility that the recording information of the different recording angle may be reproduced. Accordingly, when the hologram recording medium is to be reproduced, it is necessary to set the hologram recording medium at the same position as that upon recording, and it is demanded to perform the positioning precisely. If such precise positioning cannot be achieved, then when the hologram recording medium is re-set or is reproduced by another apparatus or when a hologram recording medium recorded by another apparatus is reproduced, the compatibility cannot be assured. This makes a factor of obstructing the placement of the angle multiple method into practical use.

Thus, the recording angle when data are recorded on a particular recording face on which data are recorded, for example, at a first recording angle of a hologram recording medium is set as a reference recording angle. Then, the recording angle after the data are recorded on the particular recording face is successively varied by a predetermined angle with reference to the set reference recording angle and fixed at the angle. Therefore, the reference recording angle set by mechanical conditions or set conditions of a recording angle variation section, an optical system and so forth of the hologram recording apparatus side and the reference recording angle on the hologram recording medium side are made coincide with each other upon particular recording such as upon first recording to enhance the compatibility. The technique for the enhancement of the compatibility just described is disclosed in International Publication Patent No. WO03/098362 (hereinafter referred to as Patent Document 1).

SUMMARY OF THE INVENTION

However, in the apparatus of Patent Document 1, since the angle recording face of a hologram recording medium is set with respect to the optical axis of signal light and adjusted so as to coincide with the reference angle face to position the hologram recording medium, the positioning method is complicated and makes an obstacle to miniaturization of the apparatus. Further, when the recording amount is increased, relating recording information reduces, and since the positioning is possible only in the angular direction, the apparatus cannot be applied to position control of the hologram recording medium. Accordingly, it cannot be avoided to record a hologram recording medium only at a known place, and even if recording and reproduction can be performed with the same apparatus on the same recording medium, the compatibility where the recording medium is removed and loaded into another apparatus cannot be assured.

It is desirable to provide a hologram reproduction apparatus and a hologram reproduction method wherein positioning between reproduction reference light and a hologram recording medium can be performed with a high degree of accuracy without complicating the apparatus such that the compatibility upon re-setting of the hologram recording medium or with another apparatus can be achieved with certainty and stability.

In order to attain the desire described above, according to an embodiment of the present invention, there is provided a hologram reproduction apparatus wherein reproduction reference light is irradiated upon a hologram recording medium, on which data are multiple recorded in accordance with an angle multiple method, while the incidence angle of the reproduction reference light to the hologram recording medium is varied and reproduction light generated from the hologram recording medium thereupon is received by an image pickup apparatus, by which the multiple data are demultiplexed from the reproduction light and reproduced, comprising an unnecessary light removal section for removing unnecessary light of the reception light to allow only necessary light included in the reproduction light to be received by the image pickup apparatus, a drive section for moving the hologram recording medium or an optical system provided for introducing the reproduction reference light to the hologram recording medium, an optical detection section for detecting a projection state of the unnecessary light removed by the unnecessary light removal section to the unnecessary light removal section, and a control section for detecting a positional displacement of the hologram recording medium based on particular information from within information relating to the detected projection state and controlling the drive section to move the hologram recording medium or the optical system so as to eliminate the detected positional displacement.

According to another embodiment of the present invention, there is provided a hologram reproduction method for a hologram reproduction apparatus wherein reproduction reference light is irradiated upon a hologram recording medium, on which data are multiple recorded in accordance with an angle multiple method, while the incidence angle of the reproduction reference light to the hologram recording medium is varied and reproduction light generated from the hologram recording medium thereupon is received by an image pickup apparatus, by which the multiple data are demultiplexed from the reproduction light and reproduced, including a removal step of removing unnecessary light included in the reception light to allow only necessary light included in the reproduction light to be received by the image pickup apparatus, a step of detecting a projection state of the removed light and detecting a positional displacement of the hologram recording medium based on particular information from within information relating to the detected projection state, and a step of moving the hologram recording medium or an optical system provided for introducing the reproduction reference light to the hologram recording medium so as to eliminate the detected positional displacement.

In the hologram reproduction apparatus and the hologram reproduction method, where the hologram recording medium is in a regularly set state wherein it has no positional displacement, the unnecessary light removal section such as an iris passes necessary light (0th order light) from within reproduction light therethrough but does not pass therethrough unnecessary light such as a crosstalk component from an adjacent recording region while the unnecessary light is projected on the surface of the iris. However, if the program recording medium has some positional displacement, then the necessary light cannot fully pass through the iris, and this appears in a projection state of the reproduction light at a portion which is an outer peripheral portion of the iris around a through-hole and on the inner side of a projection region of the reproduction light generated from a recording area adjacent a recording area of a reproduction target on the hologram recording medium. Therefore, the projection state is detected by the optical detection section, and feedback control is performed such that the hologram recording medium is moved based on detection information detected by the optical detection section so that a reproduction light projection state which does not exhibit any positional displacement may be obtained to set the hologram recording medium to a regular set state. Consequently, positioning of the reproduction reference light and the hologram recording medium can be performed with a high degree of accuracy without complicating the apparatus. As a result, reproduction when the hologram recording medium is re-set or compatible reproduction with another apparatus can be performed with certainty and stably.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 8 is a block diagram showing a configuration of part of a hologram reproduction apparatus according to a fourth embodiment of the present invention.

DETAILED DESCRIPTION OF THE PREFERRED EMBODIMENTS

First Embodiment

Figure 1:
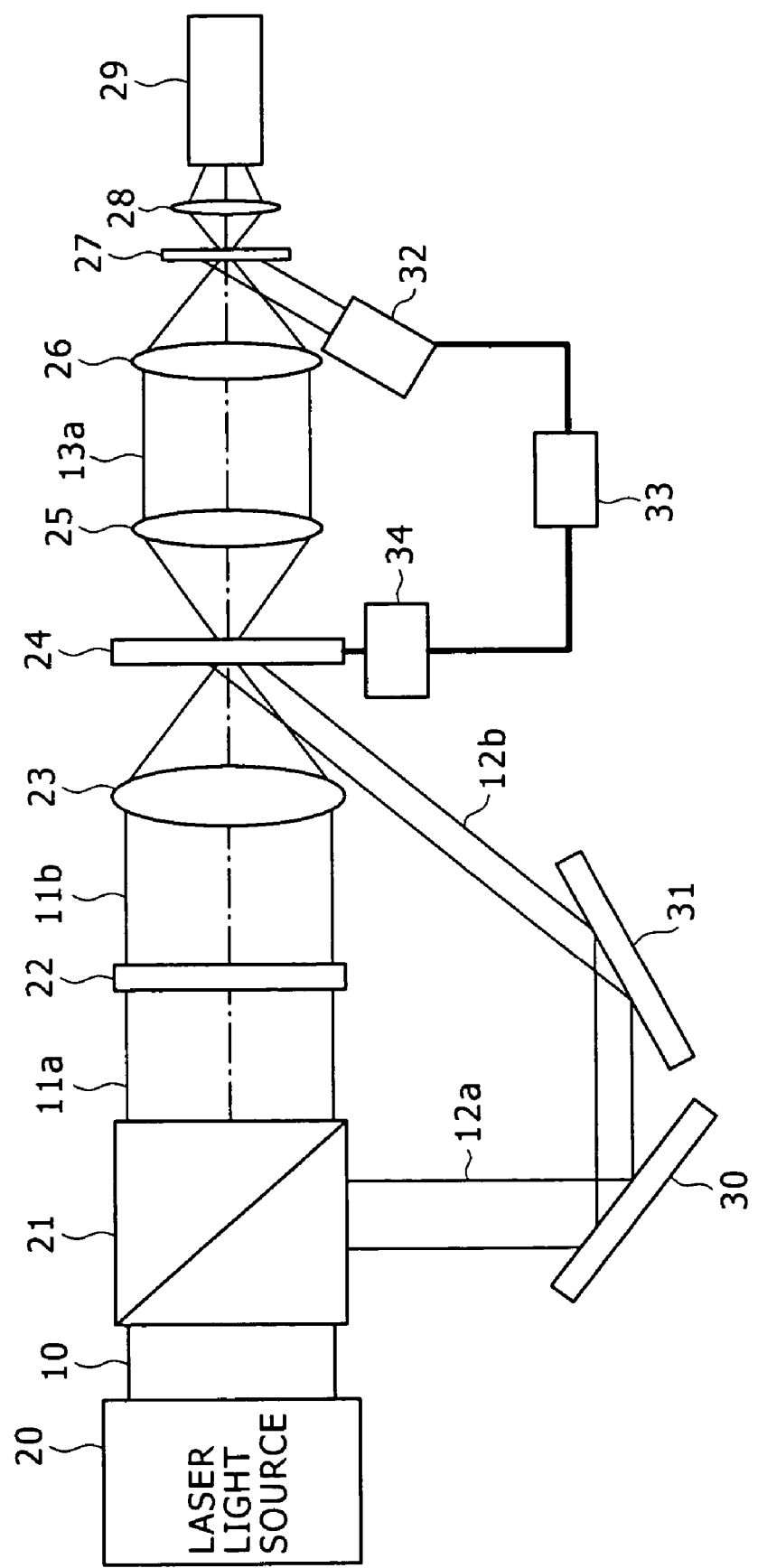
FIG. 1 is a block diagram showing a configuration of a hologram reproduction apparatus according to a first embodiment of the present invention.

Referring first to FIG. 1, there is shown a configuration of a hologram reproduction apparatus according to a first embodiment of the present invention. The hologram reproduction apparatus shown is formed as an apparatus which includes a recording system for the convenience of description and includes a laser light source 20, a polarizing beam splitter (PBS) 21, a spatial light modulator 22, a signal light lens 23, and a hologram recording medium 24. The hologram reproduction apparatus further includes a pair of reproduction light lenses 25 and 26, an iris 27, a lens 28, an image pickup apparatus 29, an advancing path changing mirror 30, and a variable angle mirror 31. The hologram reproduction apparatus further includes an optical detector 32 formed from a CCD unit or a CMOS unit for receiving projection light on the iris 27, a position control section 33 for controlling the position of the hologram recording medium 24, and a drive mechanism 34 for moving the hologram recording medium 24. It is to be noted that, where only reproduction is required, the polarizing beam splitter (PBS) 21, spatial light modulator 22 and signal light lens 23 can be eliminated.

Operation of the hologram reproduction apparatus of the present embodiment is described. A laser beam 10 emitted from the laser light source 20 is split into a P wave 11a and an S wave 12a by the polarizing beam splitter 21. The laser light source 20 may be formed as a laser which generates a wavelength around visible radiations. The P wave 11a passes through the spatial light modulator 22, whereupon it is spatially converted into signal light 11b in response to a data page displayed on the spatial light modulator 22. The spatial light modulator 22 may be formed from an LCD panel of the transmission type or the reflection type which are used popularly or a device which is used for an image display apparatus such as a DMD device or a GLV device. The signal light 11b is condensed in a recording area of the hologram recording medium 24 by the signal light lens 23. Here, the hologram recording medium 24 need not necessarily intersect perpendicularly with the optical axis of the signal light 11b.

Meanwhile, the S wave 12a is deflected to a different advancing path by the advancing path changing mirror 30 and is introduced as reference light 12b into the variable angle mirror 31. The variable angle mirror 31 is mounted for variation of the angle thereof and sets the incidence angle of the reference light 12b to the hologram recording medium 24. The reference light 12b having the incidence angle set by the variable angle mirror 31 is irradiated upon the hologram recording medium 24 such that it covers the irradiation range of the signal light 11b on the hologram recording medium 24. The signal light 11b and the reference light 12b interfere with each other in the recording area of the hologram recording medium 24, and interference information thereupon is recorded in the recording area. Thereafter, a data page to be recorded next is displayed on the spatial light modulator 22 and the incidence angle of the reference light is varied by the variable angle mirror 31, and the information of the data page to be recorded next is multiple recorded as interference information in the same recording area in a similar manner as described above.

Thereafter, if only the reference light 12b same as that upon recording is irradiated as reproduction reference light 12b upon the recording area of the hologram recording medium 24, then diffracted light which reflects the interference information recorded in the hologram recording medium 24 is generated. The diffracted light passes through the light lenses 25 and 26 which form a 4f system to form reproduction light 13a, which is condensed on the iris 27. The portion at which the diffracted light is generated and the light condensing portion of the iris 27 have a mirror image relationship, and light other than the 0th order light and light produced by crosstalk from an adjacent recording area are removed by the iris 27 while only light which has the reproduction information passes through the iris 27. The light passing through the iris 27 is condensed by the lens 28 on and photoelectrically converted by the image pickup apparatus 29 to form reproduction data.

Figure 2:
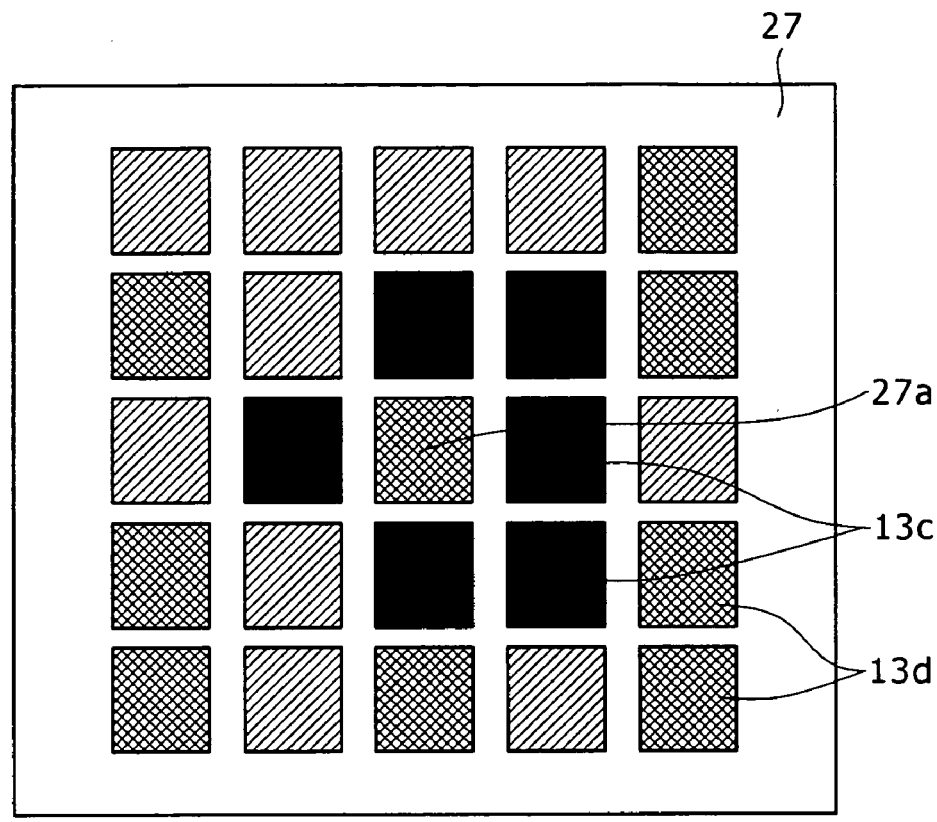
FIGS. 2, 3 and 4 are schematic views illustrating reproduction light projected in different manners to an iris shown in FIG. 1.

Referring to FIG. 2, the iris 27 is formed from a baffle having a hole 27a formed therein. The size of the hole 27a is usually set to a limit value of the iris. Therefore, the reproduction light 13a generated from the object recording area passes through the hole 27a while surplus light generated from an adjacent recording area is intercepted by the baffle so that it may not be admitted into the image pickup apparatus 29 side.

FIG. 2 shows the front face of the iris 27. The hole (through-hole or perforation) 27a of the iris 27 is perforated in the baffle and the size thereof is usually set to a limit amount of the iris as described above. Therefore, only the 0th order light of the reproduction light 13a generated from the recording area of the reproduction target passes through the iris 27. Higher-order lights including the first-order light of the reproduction light 13a generated from the recording area of the reproduction target and reproduction light of another data page as well as reproduction light generated from adjacent recording areas have different optical axes from that of the 0th order light described above and therefore cannot pass through the hole 27a. Consequently, no undesirable light component is mixed into the light to be introduced into the image pickup apparatus 29.

In particular, reproduction light 13c generated from recording areas adjacent the recording area of the reproduction target on the hologram recording medium 24 and reproduction light 13d generated from recording areas adjacent the adjacent areas are projected on the front face of the baffle from which the iris 27 is formed as seen in FIG. 2. Although surplus reproduction light usually includes various components, the light of the components is much lower in intensity than the necessary light (0th order light of the reproduction light 13a generated from the recording area of the reproduction target).

Figure 3:
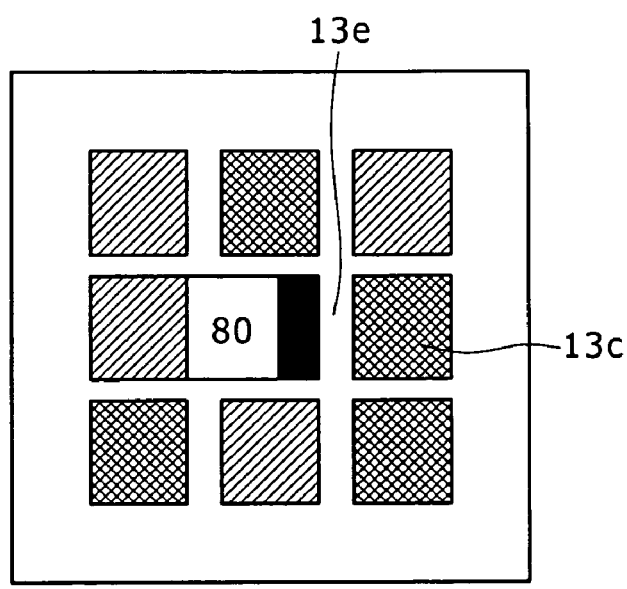

Meanwhile, the light receiving face of the optical detector 32 receives surplus light with an arrangement similar to that shown in FIG. 2. In particular, the arrangement of the surplus light is same as that where the front face of the baffle of FIG. 2 is replaced by the light receiving face of the optical detector 32. Here, if the set position of the hologram recording medium 24 is quite same as that upon recording, then the 0th order light of the reproduction light 13a generated from the recording area of the reproduction target passes through the iris 27, and the unnecessary components of the reproduction light are projected on the baffle of the iris 27 as seen in FIG. 2. However, if the set position of the hologram recording medium 24 is displaced, then since the recording area of the reproduction target is displaced, the advancing direction of the 0th order light of the reproduction light 13a generated from the recording area of the reproduction target is displaced and the front face of the baffle of the iris 27 exhibits such a light receiving state of the reproduction light as seen in FIG. 3.

In particular, the 0th order light 80 of the reproduction light 13a cannot path through the hole 27a of the iris 27 but is projected to some other direction around the hole 27a. Here, even if the light receiving face of the optical detector 32 is replaced with the front face of the baffle of the iris 27 shown in FIG. 3, a quite similar projection state is provided, and the light receiving level of a portion of the light receiving area on the left side in FIG. 3 of the light receiving region disposed around the hole 27a and on the inner side of the projection region of the reproduction light 13c (a region which corresponds to a region indicated by 13e of FIG. 3 and which is positioned around the hole 27a of the iris 27 and between the light projection region of the reproduction light 13c and the projection region of reproduction light 13c generated from an adjacent recording area). Since the 0th order light of the reproduction light 13a is very high in intensity as described hereinabove, it can be discriminated clearly in which direction the projection region of the reproduction light 13c is displaced, and this is detected from the fact that the reception light level at a particular portion of the light reception region of the optical detector 32 is high.

Accordingly, the position control section 33 processes detection information from the optical detector 32 by image processing to determine a positional displacement of the 0th order light 80 of the reproduction light 13a, that is, a positional displacement of the set portion of the hologram recording medium 24 and generate a driving control signal for correcting the positional displacement of the hologram recording medium 24. The driving control signal is applied to the drive mechanism 34 to move the hologram recording medium 24 so as to eliminate the positional displacement (so that the one-sidedness of the light reception level of the light reception region may be eliminated) to set the hologram recording medium 24 to a regular position. In short, the position control section 33 performs such control as to position the hologram recording medium 24 normally at the regular position free from a positional displacement through a feedback loop of movement of the optical detector 32, which detects the state of the reproduction light 13a projected on the baffle of the iris 27, position control section 33, drive mechanism 34 and hologram recording medium 24 and state variation of the reproduction light 13a projected on the baffle of the iris 27.

Figure 4:
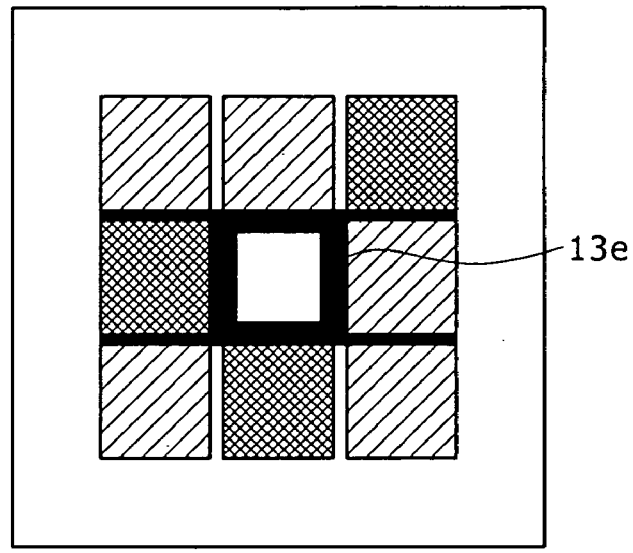

Incidentally, if the hologram recording medium 24 is displaced in the focusing direction (advancing direction of the reproduction light), then since the light flux of the reproduction light 13a expands, the reproduction light 13a of the baffle exhibits such a projection state as seen in FIG. 4. In particular, the 0th order light of the reproduction light 13a generated from the recording area of the reproduction target cannot be included within the hole 27a but expands uniformly to a surrounding portion 13e of the hole 27a. If the light reception level of the light reception region (portion represented by 13e) of the light reception face of the optical detector 32 is uniform and exhibits a level higher than a predetermined level, then the position control section 33 decides that the hologram recording medium 24 is displaced in the focusing direction. Then, the position control section 33 moves the hologram recording medium 24 forwardly in the focusing direction by means of the driving mechanism to set the position of the hologram recording medium 24 so that the reception light level of the light reception region may be reduced almost to zero (lower than a predetermined level). Consequently, the reproduction light of the iris 27 exhibits such a projection state as shown in FIG. 2, in which the 0th light of the reproduction light 13a generated from the recording area of the reproduction target alls passes through the iris 27 and is condensed on the image pickup apparatus 29 thereby to establish an in-focus condition of the reproduction light 13a.

On the other hand, if the inclination of the hologram recording medium 24 around an intersecting axis which appears when a plane along which the angle of the reference light 12b varies and the plane of the hologram recording medium 24 interest with each other is different from that upon recording, even if the incidence angle of the reference light 12b for reproducing a certain data page is correct, since the wavefront of the reference light 12b is delicately different from the wavefront of reference light used upon recording, the reproduction image data obtained by the image pickup apparatus 29 become darker and the S/N ratio is deteriorated. Therefore, when the projection state of the reproduction light 13a of the iris 27 is such a defocused state as seen in FIG. 4, if the inclination of the hologram recording medium 24 is varied by the drive mechanism 34 under the control of the position control section 33 so that the sum total of the reception light level in the light reception region (portion represented by 13e) of the light reception face of the optical detector 32 becomes maximum, then the inclination of the hologram recording medium 24 described above can be adjusted to that upon recording thereby to prevent deterioration of the S/N ratio of the reproduction image data.

According to the hologram reproduction apparatus of the present embodiment, since, upon reproduction, a reproduction light projection state of the reproduction light 13a on the baffle of the iris 27 is detected and a displacement of the hologram recording medium 24 from its regular position is detected based on the detected reproduction light projection state and then the position of the hologram recording medium 24 is moved so as to eliminate the displacement, the positional relationship between the irradiation beam of the reference light 12b and the recording area (recording region) of the hologram recording medium 24 and the positional relationship between the irradiation beam of the reference light and the recording area upon recording can always be made same as each other. This corresponds to the fact that, since the range of the hologram recording medium 24 upon which the reference light 12b is irradiated is same as that of the reference light upon recording and the recording area of the reproduction target is positioned there and besides the 0th order light of the reproduction light 13a is all introduced into the image pickup apparatus 29, also when the hologram recording medium re-set or another hologram recorded by another apparatus is to be reproduced, the recording area of the reproduction target can be reproduced with certainty. Therefore, re-setting of the hologram recording medium 24 or another hologram recording medium 24 shift-multiple recorded by another apparatus can be performed without any trouble.

Further, in the hologram reproduction apparatus of the present embodiment, since reproduction light is used to detect the positional displacement of the hologram recording medium 24 but light of another wavelength is not used for the detection, an existing optical system can be used as it is and there is no necessity to provide a separate optical system. Further, since only it is necessary to additionally provide a positioning control system of a simple configuration, the advantages described above can be achieved at a low cost without degrading minimization of the apparatus. Further, since a difference in various characteristics (for example, a temperature characteristic) is not caused by a difference in wavelength, positioning of the hologram recording medium 24 can be performed with a high degree of accuracy.

Further, since the hologram reproduction apparatus of the present embodiment involves such control as to cause all of the 0th light of the reproduction light 13a generated from the recording area of the reproduction target to pass through the hole 27a thereby to eliminate the positional displacement of the hologram recording medium 24, an error or a difference in installation position of the reproduction optical system or the image pickup apparatus 29 between different apparatus is eliminated so that all of the 0th light of the reproduction light 13a is introduced into the image pickup apparatus 29. Consequently, also from this point, the compatibility between different apparatus can be assured.

It is to be noted that, while the optical detector 32 of the hologram reproduction apparatus of the present embodiment is presumably formed from an array of multi-pixel light reception elements, similar effects can actually be achieved even where an optical detector formed from light reception elements of a smaller number of pixels such as, for example, four pixels or eight pixels.

Second Embodiment

Figure 5:
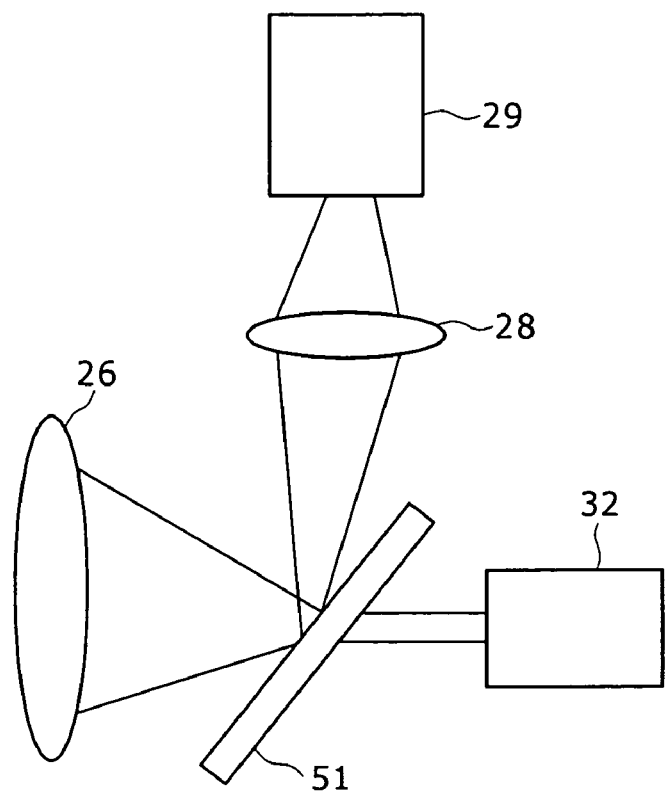
FIG. 5 is a block diagram showing a configuration of part of a hologram reproduction apparatus according to a second embodiment of the present invention.

FIG. 5 shows a configuration of part of a hologram reproduction apparatus according to a second embodiment of the present invention. The hologram reproduction apparatus of the present embodiment is a modification to and has a structure similar to that of the hologram reproduction apparatus of the first embodiment but is different in that it replaces the iris with a mirror 51. The mirror 51 is structured such that it reflects light only at a portion thereof upon which the 0th order light of the reproduction light is to irradiate while it passes light therethrough at the other portion thereof. Accordingly, if the set position of the hologram recording medium is correct, then the 0th order light of reproduction light introduced to the mirror 51 by the lens 26 comes to and is reflected from the reflecting portion of the mirror 51 thereby to change its advancing direction. Thereafter, the 0th order light of the reproduction light is condensed on the image pickup apparatus 29 by the lens 28.

On the other hand, the components of the reproduction light other than the 0th order light pass through the mirror 51 and advance straightforwardly until they come to the optical detector 32. When the hologram recording medium is positioned correctly, the 0th order light of the reproduction light does not come to a region of the mirror 51 around the reflecting region, and consequently, the reception light level in the light reception region of the light reception face of the optical detector 32 is low and uniform in all directions. However, if the set position of the hologram recording medium 24 is displaced, then part or all of the 0th order light of the reproduction light protrudes from the hole 27a, and consequently, a deviation appears in the light reception level in the light reception region and a high light reception level is exhibited similarly as in the case of the hologram reproduction apparatus of the first embodiment. The position control section 33 detects the high light reception level and performs control in response to the displacement of the 0th order light of the reproduction light to move and set the hologram recording medium 24 to and at a correct position.

Also the hologram reproduction apparatus of the present embodiment exhibits similar advantages to those of the hologram reproduction apparatus of the first embodiment. However, the mirror 51 is not limited to a mirror configured such that it reflects light only at a portion thereof upon which the 0th order light of reproduction light is to irradiate. In particular, also where a mirror is structured conversely such that it passes the 0th order light of reproduction light therethrough and reflects the other components of the reproduction light, similar advantages can be anticipated by replacing the image pickup apparatus 29 and the optical detector 32. Which one of the structures should be adopted may be determined depending upon the material and the optical characteristics of the mirror 51.

Third Embodiment

Figure 6:
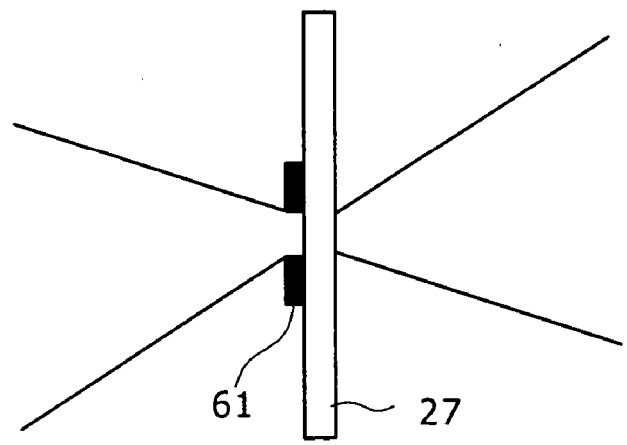
FIG. 6 is a block diagram showing a configuration of part of a hologram reproduction apparatus according to a third embodiment of the present invention.
Figure 7:
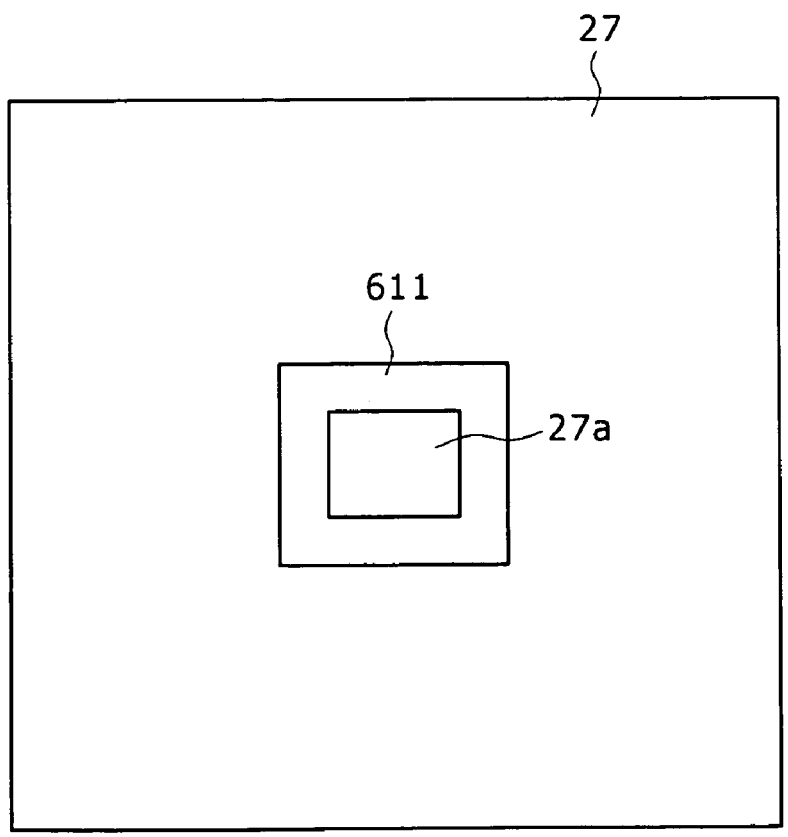
FIG. 7 is a front elevational view of an iris shown in FIG. 6.

FIG. 6 shows a configuration of part of a hologram reproduction apparatus according to a third embodiment of the present invention and particularly shows an optical detector 32. Also the hologram reproduction apparatus of the present embodiment is a modification to but is different from the hologram reproduction apparatus of the first embodiment in the configuration of the optical detector 32. Referring to FIG. 6, the optical detector 32 of the hologram reproduction apparatus of the present embodiment is configured such that a light reception region having a small width is formed by disposing a plurality of light reception elements 61 which can detect the intensity of light such as Pin diodes around the hole 27a of the iris 27. FIG. 7 shows a front elevation of the iris 27. Referring to FIG. 7, the light reception region 611 corresponds to a region which is positioned around the hole 27a of the iris 27 between the hole 27a and a projection position of reproduction light generated from recording areas adjacent a recording area to be reproduced, and has a shape of a framework of a small width. Thus, the position control section 33 detects a positional displacement of the hologram recording medium 24 based on detection signals of the light reception elements 61 when the reproduction light 13a is projected on the iris 27 and performs control similar to that in the hologram reproduction apparatus of the first embodiment. Consequently, similar advantages to those of the hologram reproduction apparatus of the first embodiment can be anticipated. It is to be noted that, since the optical detector 32 is provided on the front side of the iris 27, the apparatus can be further reduced in size.

Fourth Embodiment

FIG. 8 shows a configuration of part of a hologram reproduction apparatus according to a fourth embodiment of the present invention. The hologram reproduction apparatus of the present embodiment is a modification to but is different from the hologram reproduction apparatus of the first embodiment in that a beam splitter 36 or a half mirror not shown is disposed between the lens 26 and the iris 27 so that reproduction light coming from the lens 26 is split into two fluxes by the beam splitter 36 or the half mirror. One of the split reproduction light fluxes passes through the iris 27 and is condensed by the lens 28 on the image pickup apparatus 29, by which it is converted into reproduction image data. The other reproduction light flux split by the beam splitter 36 is condensed on the optical detector 32.

If a positional displacement occurs with the hologram recording medium 24, then also the position of the reproduction light condensed on the optical detector 32 is displaced. Consequently, a great deviation appears with the light reception level in the light reception region (having such a shape of the light reception region 611 as described hereinabove with reference to FIG. 7) provided on the light reception face of the optical detector 32. Therefore, the optical detector 32 detects positional displacement information of the hologram recording medium 24 based on reception light level deviation information of the light reception region 611 and performs control of the position control section 33 to move the position of the hologram recording medium 24 so that the positional displacement may be eliminated similarly as in the hologram reproduction apparatus of the first embodiment. As a result, also the hologram reproduction apparatus of the present embodiment exhibits similar advantages to those of the hologram reproduction apparatus of the first embodiment.

It is to be noted that the present invention is not limited to the embodiments described hereinabove but can be carried out in various modified forms in terms of the particular configuration, function, action and advantage without departing from the spirit and scope of the present invention. For example, while the optical detector 32 in the hologram reproduction apparatus of the first embodiment is formed from an image pickup apparatus such as a CCD sensor or a CMOS sensor, it may be configured otherwise such that it is formed from a single element such as a single photodiode for detecting only whether the intensity of light is high or low. In this instance, while the photodiode receives projection information of reproduction light projected on the baffle of the iris 27, the hologram recording medium 24 is moved at least in two directions. Consequently, a particular portion of the projection information varies, and the variation pattern is detected by the position control section 33. Since the variation pattern is unique in response to the displacement of the hologram recording medium 24, the displacement of the hologram recording medium 24 is detected conversely from the variation pattern, and the hologram recording medium 24 is moved by the drive mechanism 34 so as to eliminate the displacement. As a result, the hologram recording medium 24 can be set to a correct position.

Further, while the displacement of the hologram recording medium 24 in the hologram reproduction apparatus of the embodiments described above is eliminated by moving the hologram recording medium 24, similar effects are achieved also by moving the reference light optical system or the reproduction light optical system to eliminate the displacement. In this instance, the optical system to be moved may be moved entirely or partly.

It should be understood by those skilled in the art that various modifications, combinations, sub-combinations and alterations may occur depending on design requirements and other factors insofar as they are within the scope of the appended claims or the equivalents thereof.

What is claimed is:

1. A hologram reproduction apparatus wherein reproduction reference light is irradiated upon a hologram recording medium, on which data are multiple recorded in accordance with an angle multiple method, while the incidence angle of the reproduction reference light to the hologram recording medium is varied and reproduction light generated from the hologram recording medium thereupon is received by an image pickup apparatus, by which the multiple data are demultiplexed from the reproduction light and reproduced, comprising:
    an unnecessary light removal section configured to remove unnecessary light of the reception light to allow only necessary light included in the reproduction light to be received by said image pickup apparatus;
    a drive section configured to move the hologram recording medium or an optical system provided for introducing the reproduction reference light to the hologram recording medium;
    an optical detection section configured to detect a projection state of the unnecessary light removed by said unnecessary light removal section to said unnecessary light removal section; and
    a control section configured to detect a positional displacement of the hologram recording medium based on particular information from within information relating to the detected projection state and control said drive section to move the hologram recording medium or said optical system so as to eliminate the detected positional displacement.

2. The hologram reproduction apparatus according to claim 1, wherein said unnecessary light removal section includes a baffle having a through-hole perforated therein and said optical detection section receives the light of the projection state to said baffle, and said control section detects the positional displacement of the hologram recording medium based on the projection state on an outer peripheral portion of said baffle around said through-hole and on the inner side of a projection region of the reproduction light generated from a recording area adjacent a recording area of a reproduction target on the hologram recording medium.

3. The hologram reproduction apparatus according to claim 1, wherein said unnecessary light removal section includes a transparent plate having a reflecting portion and said optical detection section receives light having passed through said transparent plate, and said control section detects the positional displacement of the hologram recording medium based on the projection state on the inner side of a projection region of the reproduction light generated from a recording area adjacent a recording area of a reproduction target on the hologram recording medium from within the light received by said optical detection section.

4. The hologram reproduction apparatus according to claim 1, wherein said unnecessary light removal section includes a transparent plate having a reflecting portion and said optical detection section receives light reflected from said reflecting portion, and said control section detects the positional displacement of the hologram recording medium based on the projection condition on the inner side portion of the projection region of reproduction light generated from a recording area adjacent a recording area of a reproduction target on the recording medium from within the light received by said optical detection section.

5. The hologram reproduction apparatus according to claim 1, wherein said optical detection section includes an image pickup apparatus including a plurality of light reception elements arrayed thereon.

6. The hologram reproduction apparatus according to claim 1, wherein said unnecessary light removal section includes a baffle having a through-hole perforated therein, and said optical detection section includes a plurality of photoelectric conversion elements disposed at an outer peripheral portion of said baffle around said through-hole and on the inner side of a projection region of the reproduction light generated from a recording area adjacent a recording area of a reproduction target on the hologram recording medium.

7. The hologram reproduction apparatus according to claim 6, wherein each of said photoelectric conversion elements is a Pin diode.

8. The hologram reproduction apparatus according to claim 1, wherein said control section controls said drive section to move said optical system entirely or partly to eliminate the positional displacement of the hologram recording medium.

9. A hologram reproduction method for a hologram reproduction apparatus wherein reproduction reference light is irradiated upon a hologram recording medium, on which data are multiple recorded in accordance with an angle multiple method, while the incidence angle of the reproduction reference light to the hologram recording medium is varied and reproduction light generated from the hologram recording medium thereupon is received by an image pickup apparatus, by which the multiple data are demultiplexed from the reproduction light and reproduced, comprising:
    a removal step of removing unnecessary light included in the reception light to allow only necessary light included in the reproduction light to be received by said image pickup apparatus;
    a step of detecting a projection state of the removed light and detecting a positional displacement of the hologram recording medium based on particular information from within information relating to the detected projection state; and
    a step of moving the hologram recording medium or an optical system provided for introducing the reproduction reference light to the hologram recording medium so as to eliminate the detected positional displacement.

10. The hologram reproduction method according to claim 9, wherein the particular information is derived from that portion of the reproduction light, projected on a baffle which passes part of the reproduction light therethrough, which is on an outer periphery around 0th order light of the reproduction light generated from a recording area of a reproduction target on the hologram recording medium and which is on the inner side of the projection region of the reproduction light generated from a recording area adjacent the reproduction area of the reproduction target.

11. The hologram reproduction method according to claim 9, wherein the positional displacement of the hologram recording medium is positional displacements in two-axis directions.

12. A hologram reproduction method for a hologram reproduction apparatus wherein reproduction reference light is irradiated upon a hologram recording medium, on which data are multiple recorded in accordance with an angle multiple method, while the incidence angle of the reproduction reference light to the hologram recording medium is varied and reproduction light generated from the hologram recording medium thereupon is received by an image pickup apparatus, by which the multiple data are demultiplexed from the reproduction light and reproduced, comprising the steps of:

detecting part of the reproduction light:
detecting a positional displacement of the hologram recording medium based on particular information from within information relating to the detected reproduction light: and
moving the hologram recording medium or an optical system provided for introducing the reproduction reference light to the hologram recording medium so as to eliminate the positional displacement,
wherein the particular information is derived from that portion of the reproduction light, projected on a baffle which passes part of the reproduction light therethrough, which is on an outer periphery around 0th order light of the reproduction light generated from a recording area of a reproduction target on the hologram recording medium and which is on the inner side of the projection region of the reproduction light generated from a recording area adjacent the reproduction area of the reproduction target.

* * * * *